United States Patent
Gingrich et al.

(10) Patent No.: US 9,464,584 B2
(45) Date of Patent: Oct. 11, 2016

(54) IGNITION AND KNOCK TOLERANCE IN INTERNAL COMBUSTION ENGINE BY CONTROLLING EGR COMPOSITION

(71) Applicant: Southwest Research Institute, San Antonio, TX (US)

(72) Inventors: Jess W. Gingrich, San Antonio, TX (US); Terrence F. Alger, II, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 936 days.

(21) Appl. No.: 13/742,627

(22) Filed: Jan. 16, 2013

(65) Prior Publication Data

US 2014/0196702 A1 Jul. 17, 2014

(51) Int. Cl.
| | |
|---|---|
| F02B 47/08 | (2006.01) |
| F02M 25/07 | (2006.01) |
| F02D 41/00 | (2006.01) |
| F02D 19/08 | (2006.01) |
| F02D 35/02 | (2006.01) |
| F02D 19/06 | (2006.01) |
| F02P 5/04 | (2006.01) |
| F02D 37/02 | (2006.01) |

(52) U.S. Cl.
CPC ....... F02D 41/0065 (2013.01); F02D 19/0671 (2013.01); F02D 19/081 (2013.01); F02D 35/02 (2013.01); F02D 41/0025 (2013.01); F02D 41/0052 (2013.01); F02M 26/15 (2016.02); F02M 26/35 (2016.02); F02M 26/36 (2016.02); F02M 26/43 (2016.02); F02M 26/46 (2016.02); F02D 37/02 (2013.01); F02D 2200/1015 (2013.01); F02M 26/04 (2016.02); F02P 5/045 (2013.01); Y02T 10/36 (2013.01); Y02T 10/47 (2013.01)

(58) Field of Classification Search
CPC .......... F02M 25/0718; F02M 25/074; F02M 25/0749; F02M 25/0742; F02D 41/0065; F02D 19/081; F02D 35/02; F02D 41/0025; F02D 41/0052; F02D 19/0671
USPC ............... 123/58.8, 568.11, 568.21; 701/108
See application file for complete search history.

(56) References Cited

U.S. PATENT DOCUMENTS 3,980,064 A * 9/1976 Ariga .................... F02B 47/06
                                                                   123/1 A
4,131,095 A * 12/1978 Ouchi .................... F02B 1/06
                                                                   123/3

(Continued)

FOREIGN PATENT DOCUMENTS

JP 2008303841 A * 12/2008

*Primary Examiner* — Mahmoud Gimie
*Assistant Examiner* — David Hamaoui
(74) *Attorney, Agent, or Firm* — Livingston Law Firm

(57) ABSTRACT

A method for improving ignition of a spark ignited internal combustion engine by controlling the composition of recirculated exhaust gas. It is assumed that the engine has a spark ignition system and an exhaust gas recirculation (EGR) loop such that at least one of the combustion cylinders is an EGR cylinder that generates an EGR stream carried by the EGR loop. Thus, the combustion charge is a mixture of air, fuel and recirculated exhaust. A first step is receiving combustibility data representing the current ignitability of the charge. It is then determined whether the energy of the ignition system is sufficient to ignite the charge. If not, the amount of hydrogen in the EGR stream is increased, which increases the ignitability of the charge.

13 Claims, 7 Drawing Sheets

(56) References Cited

U.S. PATENT DOCUMENTS

| | | | | |
|---|---|---|---|---|
| 5,178,119 A * | 1/1993 | Gale | F02B 41/06 | 123/568.12 |
| 5,894,726 A * | 4/1999 | Monnier | F02D 41/0082 | 123/443 |
| 6,655,324 B2 * | 12/2003 | Cohn | F02B 1/12 | 123/1 A |
| 6,742,507 B2 * | 6/2004 | Keefer | F02M 25/10 | 123/527 |
| 8,291,891 B2 * | 10/2012 | Alger, II | F02D 13/0238 | 123/315 |
| 8,355,819 B2 * | 1/2013 | Kirzhner | F02C 7/22 | 60/790 |
| 8,561,599 B2 * | 10/2013 | Gingrich | F02M 25/0707 | 123/568.17 |
| 8,769,927 B2 * | 7/2014 | Alger, II | F02M 25/0749 | 60/274 |
| 8,893,687 B2 * | 11/2014 | Gingrich | F02D 41/0065 | 123/315 |
| 8,899,016 B2 * | 12/2014 | Gingrich | F01N 3/105 | 123/568.11 |
| 8,944,034 B2 * | 2/2015 | Gingrich | F02B 27/0215 | 123/315 |
| 8,996,281 B2 * | 3/2015 | Gingrich | F02D 41/0255 | 123/568.17 |
| 9,180,408 B2 * | 11/2015 | Perry | B01D 53/9477 | |
| 9,194,307 B2 * | 11/2015 | Geckler | F02D 41/0065 | |
| 9,206,769 B2 * | 12/2015 | Burrahm | F02M 25/0718 | |
| 2008/0022680 A1 * | 1/2008 | Gingrich | F01N 13/107 | 60/605.2 |
| 2012/0260895 A1 * | 10/2012 | Hayman | F02B 47/08 | 123/559.1 |
| 2012/0260897 A1 * | 10/2012 | Hayman | F02D 41/005 | 123/568.2 |
| 2014/0190458 A1 * | 7/2014 | Gingrich | F02B 47/08 | 123/568.2 |

\* cited by examiner

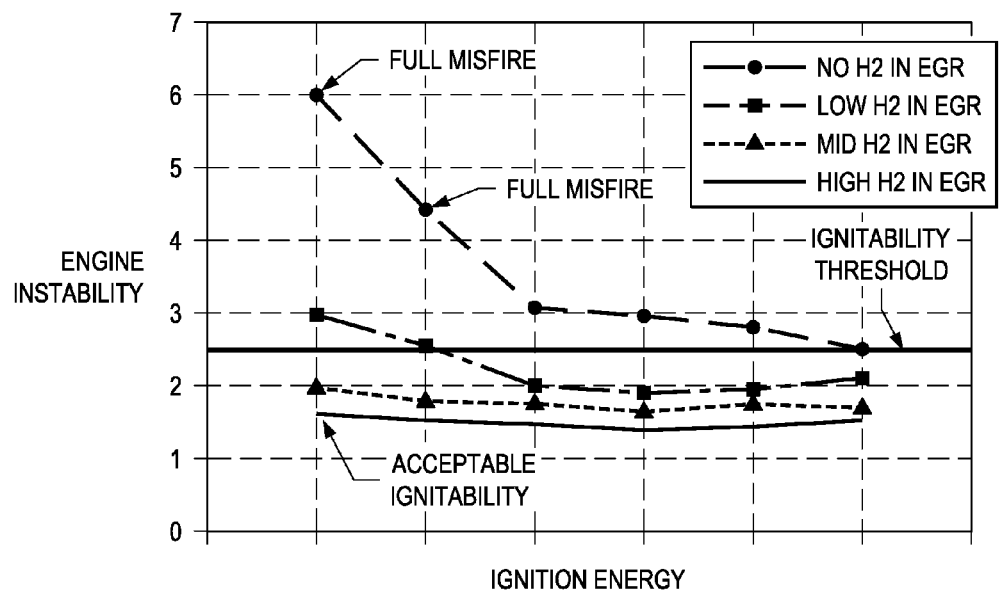
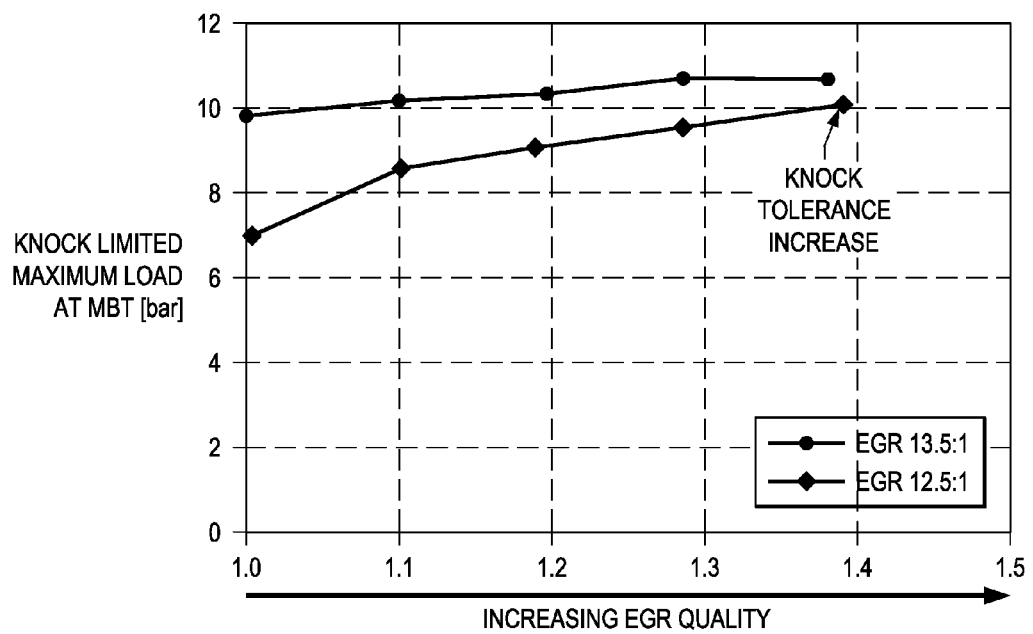

US 9,464,584 B2

IGNITION AND KNOCK TOLERANCE IN INTERNAL COMBUSTION ENGINE BY CONTROLLING EGR COMPOSITION

TECHNICAL FIELD OF THE INVENTION

This invention relates to internal combustion engines having exhaust gas recirculation (EGR) systems, and more particularly to controlling the composition of the recirculated exhaust to improve various engine combustion attributes, such as ignitability, anti-knock, ignition timing, and particle emissions.

BACKGROUND OF THE INVENTION

During operation of a spark ignited engine equipped with an exhaust gas recirculation system, the combustion cylinders are provided with a "charge" consisting of fuel, air and recirculated exhaust. This charge is ignited within the cylinders by the igniter of the engine's ignition system.

The amount of energy needed for a given ignition system to initiate and sustain combustion throughout the cylinder is dependent on variables such as temperature, pressure, flow velocities and composition of the charge. These variables make the ignition system a cause of combustion instabilities.

Conventionally, combustion instability is addressed by increasing the energy or power of the ignition system. However, conventional spark ignition systems, which include both capacitive and inductive discharge electrical systems and chemical pilot ignition systems, are limited in the amount of energy they can deliver to chamber through the ignitor.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates engine ignition instability as a function of ignition energy and the effect of differing amounts of H2 in the EGR.

FIG. 5 illustrates a how the onset of engine knock is related to EGR composition.

DETAILED DESCRIPTION OF THE INVENTION

Figure 1:
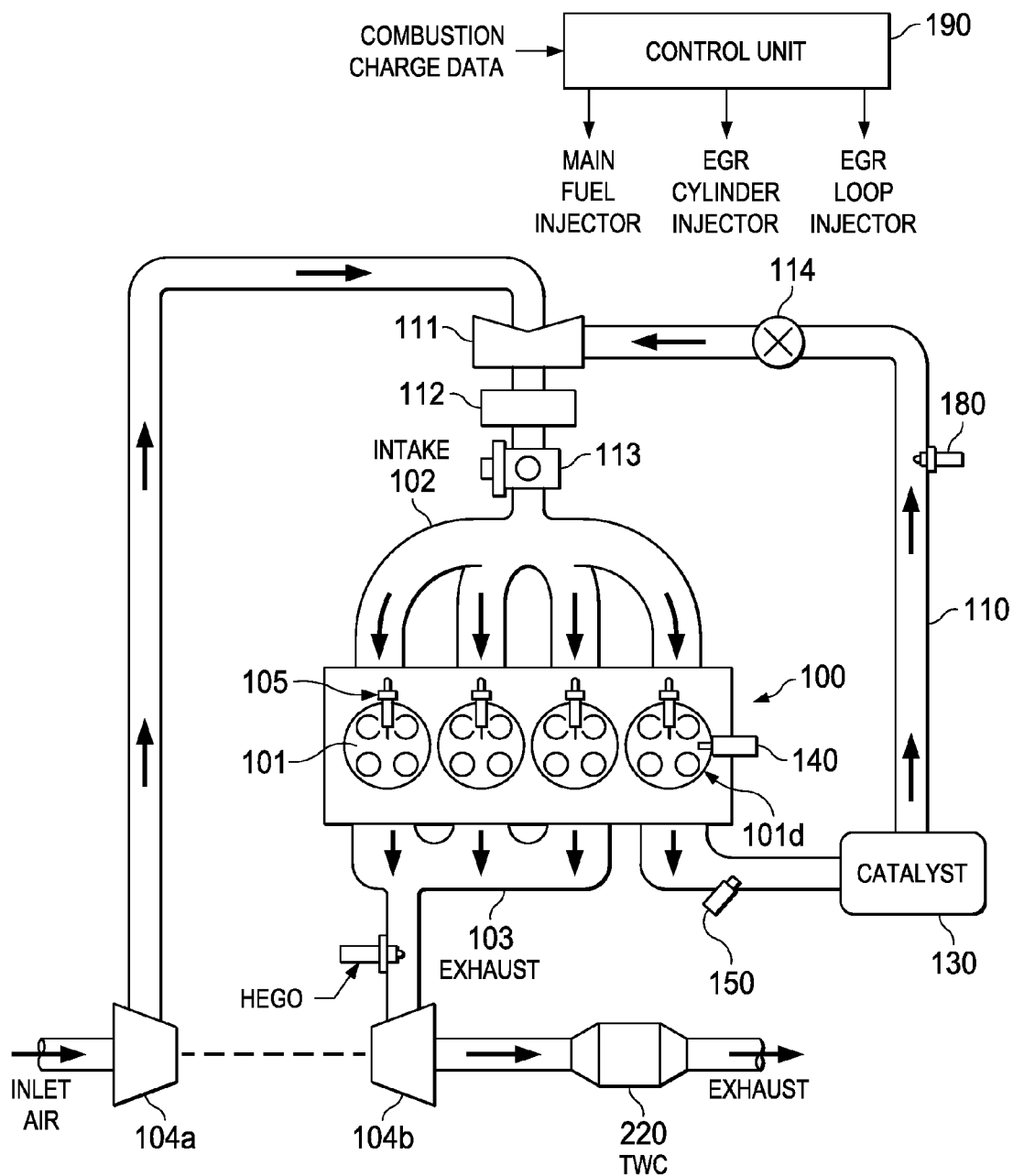
FIG. 1 illustrates a spark ignited engine having ignition control by means of control of EGR composition.

The following description is directed to internal combustion engines equipped with an exhaust gas recirculation (EGR) system. Exhaust gas recirculation is a technology used with internal combustion engines to reduce nitric oxides (NOx) in the engine exhaust. EGR works by recirculating a portion of an engine's exhaust gas back to the engine cylinders. The recirculated exhaust, added to the fuel and oxygen, increases the specific heat capacity of the cylinder contents, which lowers the adiabatic flame temperature.

As further explained below, control of EGR composition can have various engine performance benefits. One such benefit is improved ignitability of the combustion charge. The methods described herein provide an approach to improving ignitability that is an alternative to adjusting the capability of the ignition system. Specifically, the ignitability of the combustion charge is increased rather than increasing the power or energy of the ignition system. Other benefits of controlled EGR composition are improved knock tolerance of the combustion charge, improved ignition timing and burn duration, and reduced particle emissions.

EGR Composition Control for Improved Ignitability

The ability to adjust many of the combustion charge's ignitability variables is limited. The charge temperature and pressure are typically dictated by the engine and by operating conditions such as engine speed or load. The composition of the fuel is typically set by regulation. Furthermore, most modern exhaust aftertreatment systems require a fixed ratio of fresh air to fuel.

However, one ignitability variable that can be adjusted is the composition of the recirculated exhaust gas (referred to here as "EGR gas" or simply "EGR"). The methods described herein actively control the EGR composition to maintain combustion stability even when the ignition system has limited power. This control over EGR composition may be achieved whenever it is determined that the ignition energy is insufficient, which may be on a cycle-by-cycle basis if necessary.

As used herein, the term "EGR composition" primarily refers to the amount of reformed fuel (hydrogen, H2, and carbon monoxide, CO) in the EGR gas stream. Also, it is the EGR composition at the engine intake that is of particular interest. Increased levels of H2 in the EGR stream results in an increase in the amount of H2 inducted by the engine. Hydrogen has low ignition energy requirements and has wide flammability limits.

In the example of this description, the engine is a positively ignited internal combustion engine of the type used for automotive vehicles. However, the same concepts could be applied to other types of internal combustion engines equipped with recirculated exhaust systems.

Further, in the example of this description, the engine is a "dedicated EGR" engine. This means that one or more of the engine's cylinders is devoted to generating EGR. In other words, the entire exhaust gas output of the dedicated EGR cylinder is recirculated back to the intake, and does not enter the engine's main exhaust system. The same concepts can be applied to engines that do not have specific dedicated EGR cylinder(s), such as an engine with one or more dual exhaust-ported cylinders that selectively deliver exhaust to either an EGR loop or a main exhaust system. For purposes of this description, a cylinder that generates EGR in this manner is referred to as an "EGR cylinder".

In general, a "dedicated EGR cylinder" is one capable of operating with a different fuel air mixture than the "main cylinders", and delivers its exhaust only to the EGR loop. For example, the dedicated EGR cylinder can be operated at a different air-fuel ratio or with a different fuel relative to the main cylinders. The main cylinders can be operated with gasoline at stoichiometric proportions and the dedicated EGR cylinder can operate rich of stoichiometric with a fuel, liquid or gaseous, that will produces higher levels of H2 and CO than gasoline due to the fuel's composition. The fuel to the dedicated cylinder can be introduced before the spark event or after the spark event to directly control the amount of reformate created in the dedicated EGR cylinder.

FIG. 1 illustrates a spark ignited internal combustion engine 100 having four cylinders 101, and having ignition control by means of EGR composition. One of the cylinders 101 is a dedicated EGR cylinder, and is identified as cylinder 101d.

Each cylinder 101 has an associated spark plug 105 or other igniter. The remainder of the ignition system is not explicitly shown, but any suitable ignition system, known or to be developed, may be used.

The engine's non-dedicated EGR cylinders 101 may be operated with any air-fuel ratio appropriate for the engine and its operating conditions. In the example of this description, the non-dedicated EGR cylinders are assumed to run stoichiometrically, allowing the use of a three way catalyst 120 as the exhaust aftertreatment device.

The dedicated-EGR cylinder 101d has all of its exhaust recirculated back to the intake manifold 102. The exhaust of the other three cylinders 101 (referred to herein as the "main" or "non dedicated" cylinders) is directed to the engine's main exhaust system via an exhaust manifold 103. In this example, the engine is said to have "25% dedicated EGR" because one of its four cylinders has all of its exhaust redirected to the intake manifold 102.

Engine 100 is equipped with a turbocharger, specifically a compressor 104a and a turbine 104b. In other embodiments, engine could be equipped with a supercharger or have some other boosted or non boosted intake system.

Although not explicitly shown, the cylinders have some sort of main fuel delivery system for introducing fuel into the cylinders. This main fuel delivery system can be fumigated, port injected, or direct injected.

The dedicated EGR cylinder 101d may also be equipped with a direct injection fuel injector 140. This fuel injector 140 may be the main means of fuel introduction for that cylinder. Alternatively, it may be a special supplemental fuel injector for injecting additional fuel into the combustion chamber of dedicated EGR cylinder 101d after the majority of combustion has occurred. As explained below, this is one method for increasing the H2 concentration in the EGR exhaust gas that exits the EGR cylinder.

The EGR exhaust is recirculated via an EGR line 110. A catalyst 130, optionally placed along the EGR line 110 can provide another method for increasing the H2 in the EGR stream by reforming fuel injected into the EGR line. An example of a suitable catalyst is a water gas shift catalyst.

An injector 150, upstream the catalyst 130 and referred to herein as the "EGR loop injector" 150, may be used to inject fuel for use by the catalyst 130 or to inject H2 directly.

The EGR line 110 joins the intake line at a mixer 111. The mixture of recirculated exhaust and fresh air is cooled with a cooler 112. A throttle 113 is used to control the amount of intake into the intake manifold 102.

An EGR valve 114 may be used to control the intake into the EGR cylinder 101d. In other embodiments, variable valve timing may be used to control EGR flow.

The dedicated EGR cylinder(s) can operate at any equivalence ratio because its exhaust will not exit the engine before passing through a non-dedicated EGR cylinder 101. For overall improvement of engine performance (not necessarily the ignition system), it may be desired to run the dedicated EGR cylinder(s) rich of stoichiometric. Also, as discussed below, providing rich EGR is another method of increasing H2 in the EGR stream.

In the example of FIG. 1, EGR loop 110 is a high pressure loop. In an engine equipped with a high-pressure EGR loop, the exhaust to be recirculated is extracted upstream of the turbocharger's turbine 103 and routed to the engine intake downstream of the turbocharger's compressor 104. An EGR system may also be implemented as a low-pressure loop, in which the exhaust to be recirculated is extracted downstream of the turbine and introduced to the engine inlet upstream of the compressor.

The EGR system has a control unit 190, which may be dedicated to EGR control or may be part of a more comprehensive engine control unit (ECU). Control unit 190 may be implemented with conventional processing and memory devices. As explained below, tasks of control unit 19 relevant to this description may include control of fuel injector 140 and/or EGR injector 150, and other aspects of the process used to provide recirculated exhaust having a desired H2 content.

In operation, control unit 190 is programmed to estimate whether or not a desired or actual inducted combustion charge is ignitable with a given ignition system. If not, it uses one of various methods (explained below) to increase the H2 concentration of the EGR stream. The added H2 increases the ignitability of the combustion charge to match, with margin, the current capability of the ignition system.

An increased amount of H2 can be actively introduced into the EGR stream in at least four ways. These methods can be used alone or in any combination. Depending on which method or methods are used, engine may or may not be equipped with EGR cylinder injector 140, EGR loop injector 150, or EGR catalyst 130. In other words, one or more of these elements may be optional, depending on how H2 in the EGR stream is to be increased.

A first method is by operating the engine rich. In the case of an engine having a dedicated EGR cylinder 101d, only that cylinder may be made to run richer than non dedicated cylinders. This may be accomplished by making use of a homogeneous or stratified charge with a port fuel injector or a direct injector, such as injector 140.

Figure 2:
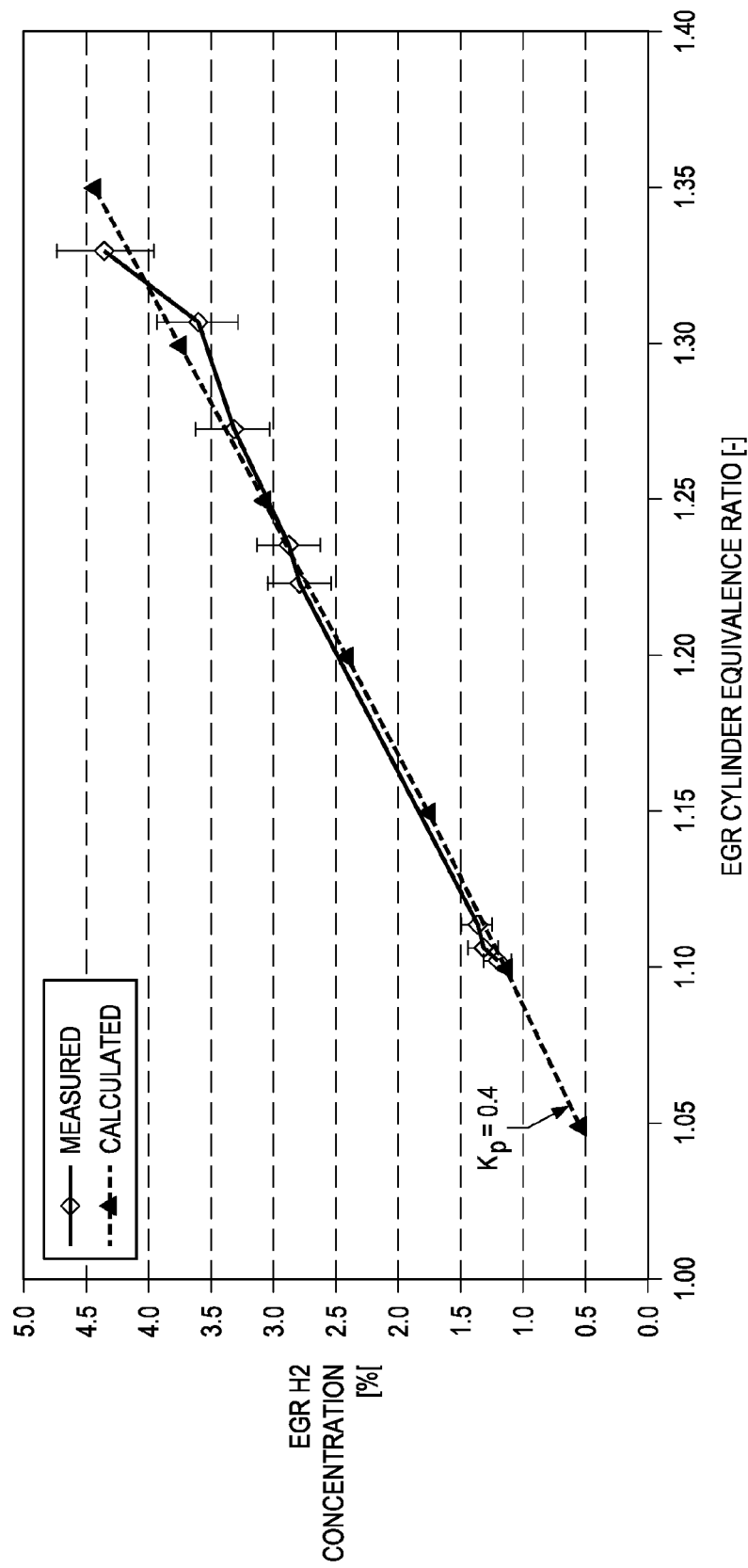
FIG. 2 illustrates the amount of H2 that can be produced in the EGR stream as a result of rich combustion.

FIG. 2 illustrates the amount of H2 that can be produced in the EGR stream as a result of rich combustion. Hydrogen levels in the exhaust can continue to increase until the rich flammability limit is reached and combustion stops.

A second method of providing an increased amount of H2 in the EGR stream is to use fuel injector 140 to inject fuel into the EGR cylinder 101d after the main combustion event. This process of injecting additional fuel is referred to herein as "post combustion fuel injection" event and may be performed for whatever number of engine cycles is determined to be appropriate.

A third method of providing an increased amount of H2 in the EGR stream is to use EGR loop injector 150 to inject fuel into the EGR stream. Catalyst 130 is then used to reform the fuel to generate H2.

A fourth method of providing an increased amount of H2 in the EGR stream is to use EGR loop injector 150 to inject H2 gas into the EGR stream.

Figure 3:
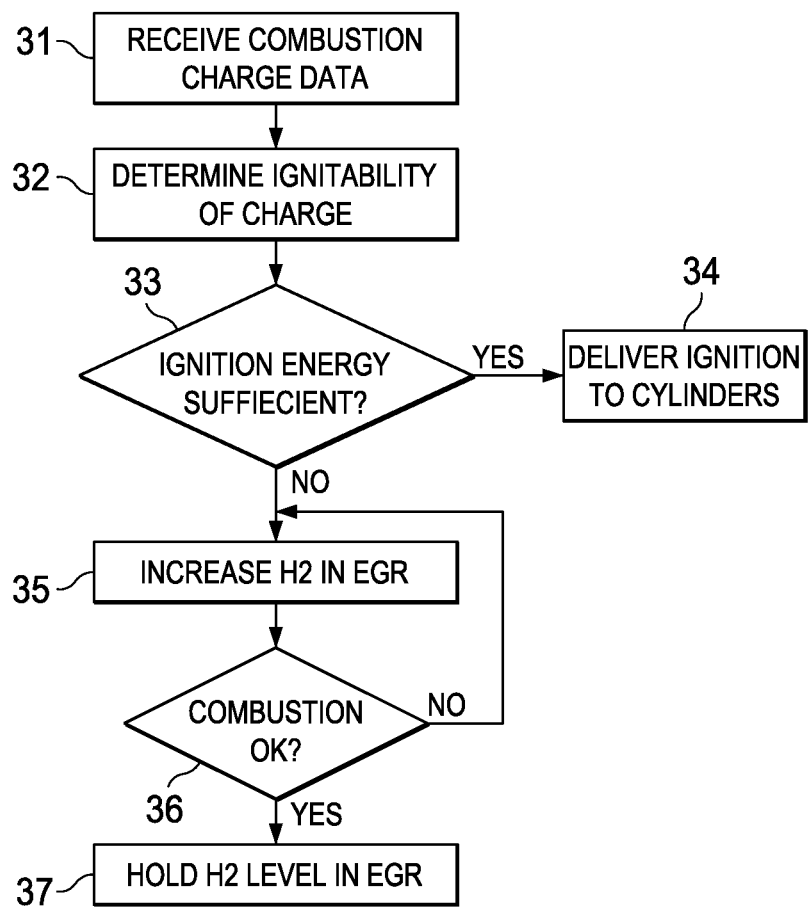
FIG. 3 illustrates a method of controlling engine charge ignitability by controlling the EGR composition.

FIG. 3 illustrates a method of controlling engine charge ignitability by controlling the amount of H2 in the EGR stream. As indicated above, this method may be implemented with appropriate programming and data provided to control unit 190. Control unit 190 then generates control signals, depending on which method(s) for increasing H2 the engine is equipped to provide and are selected to be activated.

Step 31 is receiving current combustion charge data. This data may include the relative amounts and compositions of its air, fuel and EGR components. Cylinder pressure and temperature may also be factored in. These values may be is measured or estimated. This "combustibility data" may comprise the variables directly or data from which these variables can be estimated. Various tables and models may be stored and used for estimations of these combustion variables.

Step 32 is estimating the ignitability of the combustion charge. This determination may be based on stored data and/or calculations capable of determining ignitability over a wide range of operating conditions.

Step 33 is determining whether, based on the results of Step 32, the current ignition energy of the ignition system is sufficient to ignite the combustion charge.

If so, Step 34 is delivering the current ignition energy to the cylinders with no change to the combustion charge. Specifically, no change to the EGR's H2 concentration is deemed necessary.

If the current ignition energy is not sufficient, Step 35 is increasing the H2 concentration in the EGR stream. As discussed above, this can be achieved in at least four ways: by richening the air-fuel ratio of any or all EGR cylinders, by post injection of fuel into an EGR cylinder, by injecting H2 into the EGR stream at some point on the EGR loop, and/or by injecting fuel into the EGR loop upstream of a reformation catalyst. Each of these methods can be used alone or any combination of these methods can be used. As explained above, a particular engine may be equipped to provide any one or more of these methods. Control unit 190 generates appropriate control signals to whatever injector, air-fuel ratio control mechanisms is appropriate for method used by that engine to increase H2.

Step 36 can be used to implement a "feedback" element into the control system by determining whether combustion occurred and produced sufficient power and efficiency. If not, H2 is continued to be increased until Step 36 is satisfied.

If combustion was successful, Step 37 is maintaining the level of H2 in the EGR. Steps 31-37 can be repeated at any point when any of the combustibility variables are likely to change or at any other desired frequency.

In various embodiments, the control method of FIG. 3 can be open loop based on calibrated tables, based on modeled feedback of H2 in the EGR stream, or based on direct and/or implied sensing of the H2 in the EGR stream. For the latter implementation, an H2 sensor 180 may be placed in the EGR stream. Thus, Step 35 may be performed by providing a calculated increase in H2 or by increasing H2 incrementally until ignitability is achieved. A calculated increase in H2 is an amount calculated to lower the minimum ignition energy needed of the charge to be within the range that the ignition system can provide.

FIG. 4 illustrates engine ignition instability as a function of ignition energy, and the effect of differing amounts of H2 in the EGR. Engine ignition instability is shown at four distinct levels of H2 in the EGR: none, low level, mid level and high level.

For the plot of FIG. 4, direct measurements were made with a variable energy spark ignition system where the combustion charge's air, fuel and EGR were held constant. The two independent variables during the test were the ignition energy and the amount of H2 in the EGR stream. Engine instability and combustion misfire were measured as the dependant variable. The ignitability of the charge was directly manipulated by means of increasing the H2 concentration in the EGR only.

As illustrated, in general, as ignition energy increases, ignition is more stable. Also, as the H2 level in the EGR increases, the required amount of ignition energy for stable ignition decreases. The highest H2 level results in the most stable ignition at the lowest energy level.

The methods discussed above minimize the ignition energy required of an ignition system, and expand the potential operating range of a dilute engine. The method allows combustion to occur in a stable manner at an operating condition and dilution level that would normally be precluded by the ignition system's energy discharge limitation. A combustion charge mixture of air, fuel and EGR dilution is generated that matches the current capability of the engine ignition system. This method improves the robustness of the system to environmental noise variables, such as humidity, ambient pressure and temperatures by varying H2 concentration levels with respect to these variables. It further improves cold-start performance and stability by increasing H2 concentration during these events.

EGR Composition Control for Improved Knock Tolerance

As discussed above, EGR constituents H2 and CO have high octane rating relative to gasoline. An increase in their quantity relative to the source gasoline fuel increases the knock tolerance of the engine.

FIG. 5 illustrates how the onset of engine knock is related to EGR composition. As EGR quality increases (H2 and CO content) so does knock tolerance. This relationship is shown for two different EGR ratios at a given engine speed, here 2500 rpm.

Figure 6:
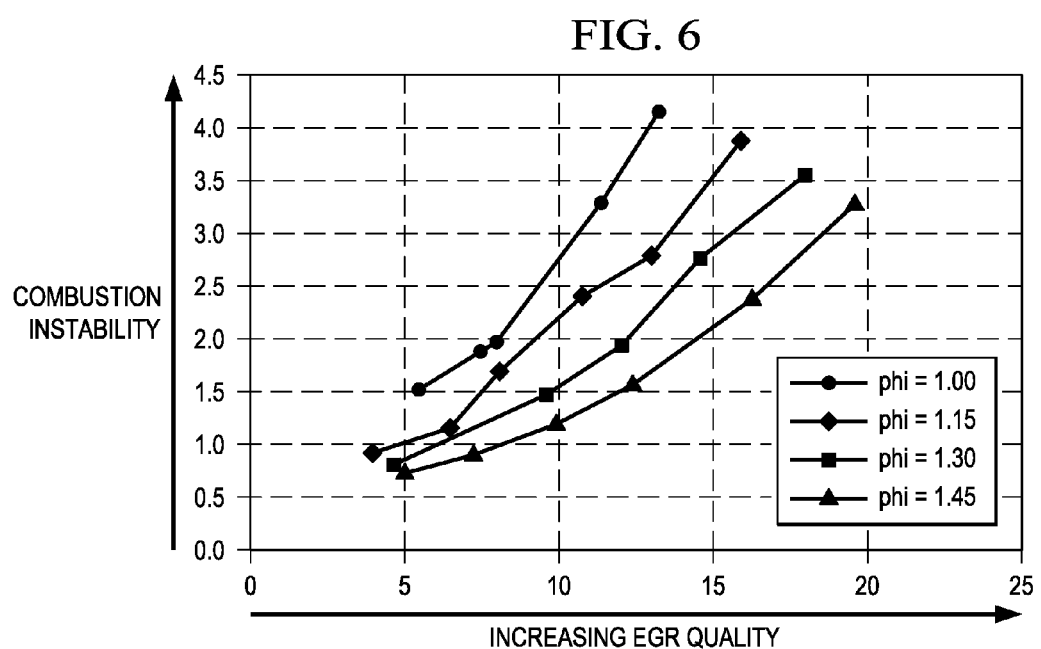
FIG. 6 illustrates how combustion stability and retarded spark timing are related to EGR composition.

FIG. 6 illustrates how combustion stability and retarded spark timing are related to EGR composition. When knock is detected, timing can only be retarded so long as the engine combustion is stable. Improved EGR quality has a dual effect on mitigating knock. Improving EGR quality (increasing H2 and CO) improves the knock tolerance of the charge without changing spark timing. Improving EGR quality also improves the level of timing retard that can be tolerated. The compounded effect is improved knock tolerance and potential timing retard that can be further exploited for knock mitigation purposes.

Control over EGR composition may be performed when it is determined that the inherent knock tolerance of the combustion charge is insufficient. As with control of EGR composition for ignitability, EGR composition can be controlled to control knock tolerance, although the engine conditions that call for adjustments are not necessarily the same.

Data representing a desired relationship between one or more operating condition inputs and a desired EGR composition can be stored and accessed during engine operation. Control unit 190 can be programmed with an engine strategy to receive operating condition input data and provide control signals to the EGR system to result in a desired EGR amount and composition. As described above, these control signals can include the air-fuel ratio of the EGR cylinder(s), which can be any lean, stoichiometric, or rich ratio.

Control over the effective octane content of the combustion charge can have the added benefit of making an engine more robust to regional fuel differences or for flex fuel mixtures. An engine can be protected from low octane fuels while benefiting from high octane fuels by operating with a high compression ratio. The octane content of a current fuel can be determined, and the EGR composition adjusted accordingly.

Figure 7:
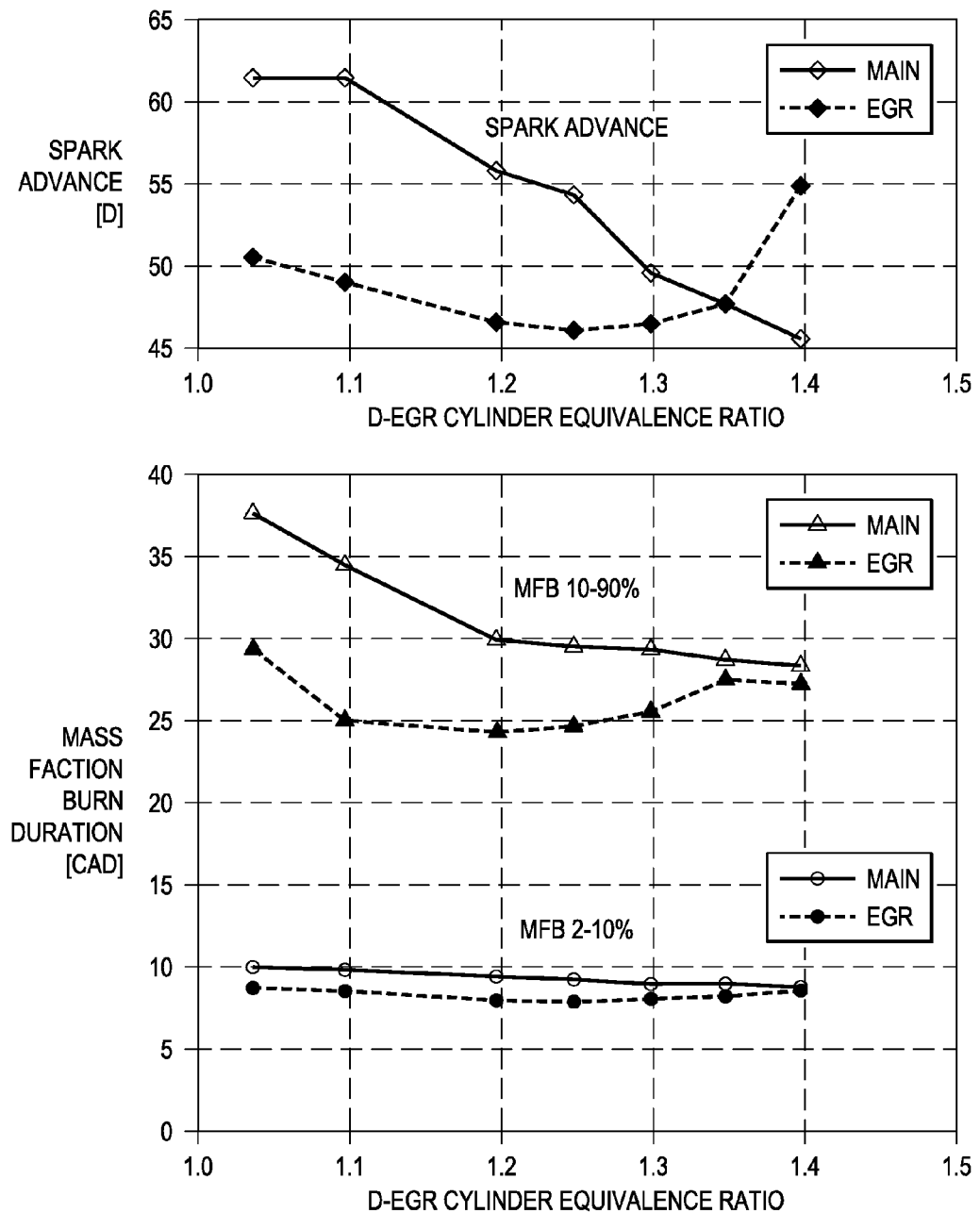
FIG. 7 illustrates how controlling EGR composition impacts combustion on all cylinders.

EGR Composition Control for Improved Ignition Timing and Combustion Burn Duration FIG. 7 illustrates how controlling EGR composition can impact combustion on all cylinders. Spark advance represents the time in the engine cycle when combustion begins. Combustion durations as broken down into two sub-groups, MFB 2-10 and MFB 10-90, where MFB 2-10 is the number of crank angle degrees that elapse from the point in the cycle where 2% of fuel mass is burned to the point where 10% is burned. As the composition of EGR is controlled by the equivalence ratio of the EGR cylinder(s), the mass flow rate doesn't change, but the effect on all cylinders of speeding up combustion and inhibiting auto-ignition is significant.

For control of ignition timing or combustion duration, control unit 190 may be programmed to receive current engine operating inputs, to access data representing a desired relationship between these inputs and a desired ignition timing or combustion duration, and to generate appropriate control signals for the EGR system.

EGR Composition Control for Decreasing Particle Emission

Direct injected engines can have high levels of particle emissions in their exhaust due to incomplete combustion. Particle emissions are commonly defined as a total mass and a particle number or count. This pollutant is currently and will continue to be a regulated emission from internal combustion engines.

Figure 8:
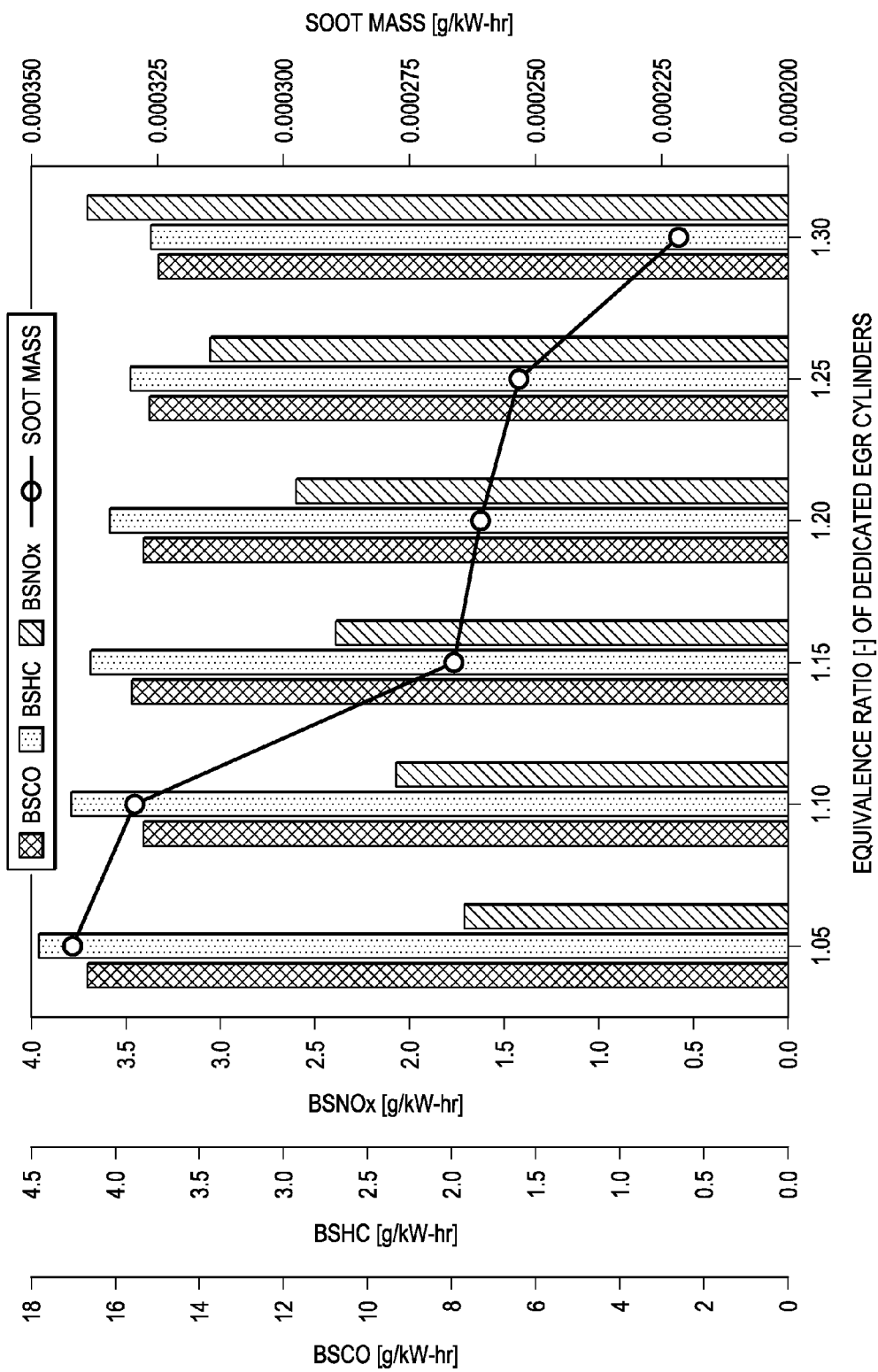
FIG. 8 illustrates how dedicated EGR cylinder(s) can be used to decrease particle emissions.

FIG. 8 illustrates how dedicated EGR cylinder(s) can be used to decrease particle emissions. Specifically, increasing the dedicated EGR cylinder equivalence ratio will decrease the particle emission. By controlling the H2 and CO level in the EGR, the control system can decrease the particle emissions in the tailpipe exhaust. This is because altering EGR composition influences flame speed, quench distance, combustion temperatures, and combustion stability.

SUMMARY

Hydrogen and carbon monoxide are the dominate species in EGR that contribute to combustion changes, such as ignitability, burn rates, autoignition or knock, quench distance, and combustion efficiency). The EGR rate may be a given percentage as defined by conventional definition (EGR_mass/(EGR_mass+air_mass)*100), but the amount of mass that is H2 or CO is actively controlled to influence combustion of all cylinders. An engine running with 25% stoichiometric EGR (equivalence ratio=1) will run differently from the same engine running with 25% rich EGR where the H2 and CO concentration are increased by running the EGR cylinder(s) rich of stoichiometric proportions.

Control of the air-fuel ratio of EGR cylinders allows control of the composition of the EGR. By actively controlling the composition of the EGR, flame speeds, combustion stability, combustion efficiency, particle emissions (mass and count), and overall brake thermal efficiency of the entire engine can be improved. Operation at a different air-fuel ratio or with a different fuel, liquid or gaseous, from that of the non EGR cylinders is acceptable because the exhaust is always re-combusted before exiting the engine.

What is claimed is:

1. A method of matching the ignitability of the charge provided to combustion cylinders of an internal combustion engine to the current state of the engine's ignition system, the engine having an exhaust gas recirculation (EGR) loop such that at least one of the combustion cylinders is an EGR cylinder that generates an EGR stream carried only by the EGR loop, comprising:
   receiving current combustion charge data representing at least air, fuel and EGR components of the combustion charge;
   estimating the ignitability of the combustion charge based on the combustion charge data;
   determining whether the current ignition energy of the ignition system is sufficient to ignite the charge based on at least data representing whether the engine is in cold start mode and further based on the results of the estimating step; and
   if the current energy of the ignition system is not sufficient to ignite the charge, increasing the amount of hydrogen in the EGR stream;
   wherein the step of increasing the amount of hydrogen in the EGR stream is performed in at least one of the following ways: providing a more rich air-fuel ratio to one or more of the EGR cylinder(s), by providing post-combustion fuel injection to one or more of the EGR cylinder(s) for one or more engine cycles, by injecting hydrogen into the EGR stream, or by injecting fuel into the EGR stream and using a reformer catalyst to generate hydrogen from this injected fuel.

2. The method of claim 1, wherein the combustibility data comprises the quantity delivered to the cylinders of one or more of the following: air, fuel and/or recirculated exhaust.

3. The method of claim 2, wherein the combustibility data further comprises data representing the in-cylinder pressure and/or temperature.

4. The method of claim 1, wherein the step of increasing the amount of hydrogen is performed by providing a calculated increase in hydrogen.

5. The method of claim 1, wherein the step of increasing the amount of hydrogen is performed by increasing the hydrogen incrementally until ignitability is achieved.

6. An improved internal combustion engine, the engine having a spark ignition system and an exhaust gas recirculation (EGR) loop such that at least one of the combustion cylinders is an EGR cylinder that generates an EGR stream carried by the EGR loop, and in which the combustion charge is a mixture of air, fuel and recirculated exhaust, the improvements comprising:
   a control unit programmed to perform at least the following tasks: to receive current combustion charge data representing at least air, fuel and EGR components of the combustion charge; to estimate the ignitability of the combustion charge based on the combustion charge data to determine whether the current ignition energy of the ignition system is sufficient to ignite the charge based on at least data representing whether the engine is in cold start mode and further based on the results of the estimating step; if the current energy of the ignition system is not sufficient to ignite the charge, to generate at least one control signal that results in an increase in the amount of hydrogen in the EGR stream.

7. The engine of claim 6, wherein the control signal results in providing a more rich air-fuel ratio to one or more of the EGR cylinder(s).

8. The engine of claim 6, wherein the control signal activates post-combustion fuel injection to one or more of the EGR cylinder(s) for one or more engine cycles, and wherein the improvement further comprises a fuel injector (s) operable to inject fuel into that cylinder(s).

9. The engine of claim 6, wherein the control signal activates injection of hydrogen into the EGR stream, and wherein the improvement further comprises an injector operable to inject hydrogen into the EGR stream.

10. The engine of claim 6, wherein the control signal activates injection of fuel into the EGR stream and wherein the improvement further comprises an injector operable to inject fuel into the EGR stream and a reformer catalyst operable to generate hydrogen from this injected fuel.

11. The engine of claim 6, wherein the combustibility data comprises the quantity delivered to the cylinders of one or more of the following: air, fuel and/or recirculated exhaust.

12. The engine of claim 11, wherein the combustibility data further comprises data representing the in-cylinder pressure and/or temperature.

13. The engine of claim 6, wherein one or more of the cylinders is a dedicated EGR cylinder.

* * * * *